(12) United States Patent
Tanaka (10) Patent No.: US 7,831,128 B2
(45) Date of Patent: Nov. 9, 2010

(54) VIDEO AND AUDIO RECORDING APPARATUS

(75) Inventor: Yoichiro Tanaka, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1085 days.

(21) Appl. No.: 11/195,925

(22) Filed: Aug. 3, 2005

(65) Prior Publication Data

US 2006/0029371 A1 Feb. 9, 2006

(30) Foreign Application Priority Data

Aug. 3, 2004 (JP) ............... 2004-227265

(51) Int. Cl.
*G06F 13/00* (2006.01)
*H04N 5/91* (2006.01)
(52) U.S. Cl. ............... 386/46; 386/83; 386/95; 725/59
(58) Field of Classification Search ............... 386/1, 386/46, 95, 96, 111–112, 121, 83; 725/28, 725/39, 43, 49, 52, 87, 34, 38, 46, 59, 134, 725/147
See application file for complete search history.

(56) References Cited

U.S. PATENT DOCUMENTS

| | | | | | |
|---|---|---|---|---|---|
| 5,537,106 | A | * | 7/1996 | Mitsuhashi | 340/825.72 |
| 6,133,910 | A | * | 10/2000 | Stinebruner | 725/49 |
| 6,772,433 | B1 | * | 8/2004 | LaJoie et al. | 725/52 |
| 6,804,824 | B1 | * | 10/2004 | Potrebic et al. | 725/38 |
| 2002/0040475 | A1 | * | 4/2002 | Yap et al. | 725/39 |
| 2002/0059599 | A1 | * | 5/2002 | Schein et al. | 725/39 |
| 2002/0174430 | A1 | * | 11/2002 | Ellis et al. | 725/46 |
| 2004/0156614 | A1 | * | 8/2004 | Bumgardner et al. | 386/46 |
| 2004/0218905 | A1 | * | 11/2004 | Green et al. | 386/83 |
| 2005/0002640 | A1 | * | 1/2005 | Putterman et al. | 386/46 |
| 2008/0184327 | A1 | * | 7/2008 | Ellis et al. | 725/134 |
| 2009/0034935 | A1 | * | 2/2009 | Putterman et al. | 386/83 |

(Continued)

FOREIGN PATENT DOCUMENTS

JP 5-76178 10/1993

(Continued)

OTHER PUBLICATIONS

Patent Abstracts of Japan, Publication No. 09-139903, Publication Date May 27, 1997, 1 page.

(Continued)

*Primary Examiner*—Thai Tran
*Assistant Examiner*—Mishawn Dunn
(74) *Attorney, Agent, or Firm*—Osha • Liang LLP (57) ABSTRACT

A video and audio recording apparatus including: a plurality of tuner units each of which receives commercial broadcasting to output video and audio signals; a distributor that distributes high-frequency signals input to an input terminal from the outside of an apparatus body to the plurality of tuner units; a video and audio recording unit that simultaneously records the video and audio signals output from the plurality of tuner units; and a remote controller that is provided with tuner switching keys for switching, in a predetermined order, a tuner unit which sets receiving channels or records the video and audio signals to be output, among the plurality of tuner units, whenever the switching key is operated.

4 Claims, 6 Drawing Sheets

U.S. PATENT DOCUMENTS

2009/0222875 A1* 9/2009 Cheng et al. ................ 725/147

FOREIGN PATENT DOCUMENTS

| JP | 6-121241 | 4/1994 |
| JP | 9-139903 | 5/1997 |
| JP | 2002-238001 | 8/2002 |
| WO | 97/46013 | 12/1997 |

OTHER PUBLICATIONS

Japanese Office Action for patent application No. 2004-227265, mailed Aug. 18, 2009, and English translation thereof, 5 pages.

* cited by examiner

|   |      |          |   |          |     |    |         |
|---|------|----------|---|----------|-----|----|---------|
| 1.| 6/05 | 9:00PM   | ~ | 11:00PM  | 6ch | XP | TUNER a |
| 2.| 6/07 | 8:00PM   | ~ | 9:00PM   | 8ch | XP | TUNER a |
| 3.| 6/07 | 8:00PM   | ~ | 9:00PM   | 4ch | XP | TUNER b |
| 4.| 6/07 | 8:00PM   | ~ | 10:00PM  | 6ch | XP | TUNER b |
| 5.| · · · · · · · · · · · · · · · |
| 6.| · · · · · · · · · · · · · · · |
| 7.| · · · · · · · · · · · · · · · |

|   |      |          |   |          |     |    |         |
|---|------|----------|---|----------|-----|----|---------|
| 1.| 6/05 | 9:00PM   | ~ | 11:00PM  | 6ch | XP | TUNER a |
| 2.| 6/07 | 8:00PM   | ~ | 9:00PM   | 8ch | XP | TUNER a |
| 3.| 6/07 | 8:00PM   | ~ | 9:00PM   | 4ch | XP | TUNER b |
| 4.| 6/07 | 8:00PM   | ~ | 10:00PM  | 6ch | XP | TUNER c |
| 5.| · · · · · · · · · · · · · · · |
| 6.| · · · · · · · · · · · · · · · |
| 7.| · · · · · · · · · · · · · · · |

USAGE TIMES OF TUNER UNIT b OVERLAP EACH OTHER.
TUNER UNIT b IS CHANGED TO TUNER UNIT c.

VIDEO AND AUDIO RECORDING APPARATUS

BACKGROUND OF THE INVENTION

1. Field of the Invention

The present invention relates to a video and audio recoding apparatus that simultaneously records video and audio signals output from a plurality of tuner units, and more specifically, to a video and audio recording apparatus having a remote controller that is provided with tuner switching keys for switching, in a predetermined order, a tuner unit which sets receiving channels or records the video and audio signals to be output, among the plurality of tuner units, whenever the switching key is operated.

2. Description of the Related Art

A personal computer has been suggested in which video and audio signals obtained from the received commercial broadcasting are converted into digital signals, and the digital signals are encoded to be recorded in an HDD. More specifically, in the personal computer, two television tuner cards having the same structure are inserted into a plurality of slots provided on a mother board. In addition, each of the inserted television tuner cards includes a tuner and an encoder for encoding video and audio signals output from the tuner. Therefore, when two broadcasting programs to be recorded are broadcasted in the same time zone, two broadcasting programs can be recorded in the hard disk drive at the same time (see the first related art).

Further, the following technique has been proposed (see the second related art). That is, when an image is displayed on a large screen by using 27 display devices composed of nine display devices by three display devices, nine types of video signals should be transmitted at the same time. Therefore, nine types of carrier signals having different frequencies are respectively modulated with nine types of video signals, and then the modulated signals are transmitted from one antenna through a mixer. Meanwhile, in the receiver side, since nine types of carrier signals are received, nine tuners are provided. In addition, the output of a receiving antenna is distributed to the nine tuners by a distributor. Thus, nine types of video signals required to be transmitted at the same time are output from the nine tuners, respectively (for example, see JP-A-9-139903).

However, when the first related art is used, the following problems arise. That is, the first related art is applied to a personal computer. Therefore, when a receiving channel is set, it is possible to simply designate a television tuner to be set from the television tuners mounted on two television tuner cards using, for example, a television screen and a mouse. However, when the first related art is applied to an HDD recorder, which is a kind of AV apparatus, using a hard disk drive as a recording medium, it is impossible to use the mouse. Therefore, a structure capable of simply designating the tuner unit to be set is needed. In addition, a structure capable of using only one additional key switch even when two or more tuners are mounted is needed.

The second related art is a technique for simultaneously transmitting a plurality of video signals. Therefore, this technique cannot be applied when a structure capable of simply designating a tuner to be set from a plurality of tuners mounted is required, or when a structure capable of using only one additional key switch even when two or more tuners are mounted is required.

SUMMARY OF THE INVENTION

The invention is designed to solve the above-mentioned problems, and it is an object of the invention to provide a video and audio recording apparatus capable of simply designating a tuner unit to be set from a plurality of tuner units by using only one additional key switch, of easily grasping the usage states of the plurality of tuner units, of easily setting programmed recording items whose recording times overlap each other, of preventing an inexecutable programmed recording item from being set due to the overlap of the usage times of a tuner unit even when a plurality of broadcasting programs are simultaneously recorded by using programmed recording, of simply setting the programmed recording using a plurality of tuner units, and of performing reception or recording using a plurality of tuner units, without using a remote controller.

Further, it is another object of the invention to provide a video and audio recording apparatus capable of simply designating a tuner unit to be set from a plurality of tuner units, using only one additional key switch, by providing, in a remote controller, tuner switching keys for switching the tuner units which set receiving channels or record video and audio signals to be output whenever the tuner switching key is operated.

Furthermore, it is yet another object of the invention to provide a video and audio recording apparatus having a tuner state display unit that displays whether video and audio signals output from a plurality of tuner units are displayed on a display device, and whether the video and audio signals are being recorded, thereby easily grasping the usage states of the plurality of tuner units.

Moreover, it is still another object of the invention to provide a video and audio recording apparatus capable of easily setting programmed recording items whose recording times overlap each other by designating tuner units used for programmed recording from a plurality of tuner units when the programmed recording is set.

Further, it is still yet another object of the invention to provide a video and audio recording apparatus capable of preventing an inexecutable programmed recording item from being set due to the overlap of the usage times of a tuner unit even when a plurality of broadcasting programs are simultaneously recorded using programmed recording, by displaying a message indicating that the usage times of tuner unit overlap each other in a plurality of programmed recording items.

Furthermore, it is yet still another object of the invention to provide a video and audio recording apparatus capable of simply setting programmed recording items by automatically designating a tuner unit whose usage times are not overlapped with each other when the usage times of the tuner unit overlap each other in a plurality of programmed recording items.

In order to achieve the object, according to an aspect of the invention, a video and audio recording apparatus includes a plurality of tuner units each of which receives commercial broadcasting to output video and audio signals; a distributor that distributes high-frequency signals input to an input terminal from the outside of an apparatus body to the plurality of tuner units; a video and audio recording unit that simultaneously records the video and audio signals output from the plurality of tuner units; a remote controller that is provided with tuner switching keys for switching, in a predetermined order, a tuner unit which sets receiving channels or records the video and audio signals to be output, among the plurality of tuner units, whenever the switching key is operated; a tuner state display unit that indicates whether the video and audio signals output from the plurality of tuner units are displayed on a display device and whether the video and audio signals are being recorded in the video and audio recording unit; and a front panel that is provided with a channel-up switch, a channel-down switch, a recording key, and tuner selecting keys whose number is equal to the number of tuner units. In the video and audio recording apparatus, the tuner unit used for each programmed recording item is designated from the plurality of tuner units in the setting of the programmed recording. Further, in setting a programmed recording item whose recording time overlaps at least a portion of the recording time of a previously set programmed recording item, when a tuner unit to be used is the same as the tuner unit used for the previously set programmed recording item, a message indicating that the usage times of the tuner unit overlap each other in a plurality of programmed recording items is displayed, and the tuner unit whose usage time is not overlapped with the usage times of the programmed recording items set until that time is automatically designated as the tuner unit to be used. In addition, when the tuner selecting key is operated, the tuner unit corresponding to the operated tuner selecting key is a target to be set.

That is, it is possible to designate an arbitrary tuner unit to be set from the plurality of tuner units by operating one key switch provided in the remote controller. In addition, the tuner state display unit displays whether signals output from the tuner units are displayed on the display device, and whether the signals are being recorded. Further, when the programmed recording items whose recording times overlap each other are set, it is possible to use different tuner units for the programmed recording items. In addition, when the tuner unit whose usage time overlaps the recording times of the other programmed recording items is designated, a message indicating that the usage times overlap each other is displayed. Further, it is possible to designate the tuner unit whose usage times are not overlapped with each other with reference to the other programmed recording items, without determining which tuner unit is the tuner unit whose usage times are not overlapped with each other. In addition, it is possible to designate the tuner unit to be operated by a channel-up key, a channel-down key, or a recording key provided in a front panel, using the tuner selecting key provided in the front panel.

Furthermore, according to another aspect of the invention, a video and audio recording apparatus includes a plurality of tuner units each of which receives commercial broadcasting to output video and audio signals; a distributor that distributes high-frequency signals input to an input terminal from the outside of an apparatus body to the plurality of tuner units; a video and audio recording unit that simultaneously records the video and audio signals output from the plurality of tuner units; and a remote controller that is provided with tuner switching keys for switching, in a predetermined order, a tuner unit which sets receiving channels or records the video and audio signals to be output, among the plurality of tuner units, whenever the switching key is operated. That is, it is possible to designate an arbitrary tuner unit to be set from the plurality of tuner units by operating one tuner switching key provided in the remote controller.

Moreover, in the above-mentioned structure, preferably, the video and audio recording apparatus further includes a tuner state display unit that indicates whether the video and audio signals output from the plurality of tuner units are displayed on a display device and whether the video and audio signals are being recorded in the video and audio recording unit. That is, the tuner state display unit displays whether signals output from the tuner units are displayed on the display device, and whether the signals are being recorded.

Furthermore, in the above-mentioned structure, it is preferable that the tuner unit used for each programmed recording item be designated from the plurality of tuner units in the setting of the programmed recording. That is, when the programmed recording items whose recording times overlap each other are set, it is possible to use different tuner units for the programmed recording items.

Moreover, in the above-mentioned structure, it is preferable that, in setting a programmed recording item whose recording time overlaps at least a portion of the recording time of a previously set programmed recording item, when a tuner unit to be used is the same as the tuner unit used for the previously set programmed recording item, a message indicating that the usage times of the tuner unit overlap each other in a plurality of programmed recording items be displayed. That is, when the tuner unit whose usage time overlaps the recording times of the other programmed recording items is designated, a message indicating that the usage times overlap each other is displayed.

Further, in the above-mentioned structure, it is preferable that, in setting a programmed recording item whose recording time overlaps at least a portion of the recording time of a previously set programmed recording item, when a tuner unit to be used is the same as the tuner unit used for the previously set programmed recording item, the tuner unit whose usage time is not overlapped with the usage times of the programmed recording items set until that time be automatically designated as the tuner unit to be used. That is, it is possible to designate the tuner unit whose usage times are not overlapped with each other with reference to the other programmed recording items, without determining which tuner unit is the tuner unit whose usage times are not overlapped with each other.

According to the invention, it is possible to designate an arbitrary tuner unit to be set from a plurality of tuner units by operating one tuner switching key provided in the remote controller. In addition, the tuner state display unit displays whether signals output from the tuner units are displayed on the display device, and whether the signals are being recorded. Further, when the programmed recording items whose recording times overlap each other are set, it is possible to use different tuner units for the programmed recording items. In addition, when the tuner unit whose usage time overlaps the recording times of the other programmed recording items is designated, a message indicating that the usage times overlap each other is displayed. Further, it is possible to designate the tuner unit whose usage times are not overlapped with each other with reference to the other programmed recording items, without determining which tuner unit is the tuner unit whose usage times are not overlapped with each other. In addition, it is possible to designate the tuner unit to be operated by a channel-up key, a channel-down key, or a recording key provided in a front panel, using the tuner selecting key provided in the front panel. Therefore, it is possible to provide a video and audio recording apparatus capable of simply designating a tuner unit to be set from a plurality of tuner units by using only one additional key switch, of easily grasping the usage states of the plurality of tuner units, of easily setting programmed recording items whose recording times overlap each other, of preventing an inexecutable programmed recording item from being set due to the overlap of the usage times of a tuner unit even when a plurality of broadcasting programs are simultaneously recorded by using programmed recording, of simply setting the programmed recording using a plurality of tuner units, and of performing reception or recording using a plurality of tuner units, without using a remote controller.

Further, according to the invention, it is possible to designate an arbitrary tuner unit to be set from a plurality of tuner units by operating one tuner switching key provided in the remote controller. Therefore, it is possible to simply designate a tuner unit to be set from a plurality of tuner units by using only one additional key switch. In addition, when the output of the tuner unit not used for recording among a plurality of tuner units is displayed on a display device, it is possible to change the channel of the commercial broadcasting displayed during the recording.

Furthermore, the tuner state display unit displays whether signals output from the tuner units are displayed on the display device, and whether the signals are being recorded. Therefore, it is possible to grasp the usage states of a plurality of tuner units.

Moreover, when the programmed recording items whose recording times overlap each other are set, it is possible to use different tuner units for the programmed recording items, which makes it possible to easily set the programmed recording items whose recording times overlap each other.

Further, when the tuner unit whose usage time overlap the recording times of the other programmed recording items is designated, it is possible to prevent an inexecutable programmed recording item from being set due to the overlap of the usage times of the tuner unit even when a plurality of broadcasting programs are simultaneously recorded by using programmed recording.

Furthermore, it is possible to designate the tuner unit whose usage times are not overlapped with each other with reference to the other programmed recording items, without determining which tuner unit is the tuner unit whose usage times are not overlapped with each other. Thus, it is possible to simplify the setting of programmed recording items.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Hereinafter, preferred embodiments of the invention will be described with reference to the accompanying drawings.

Figure 1:
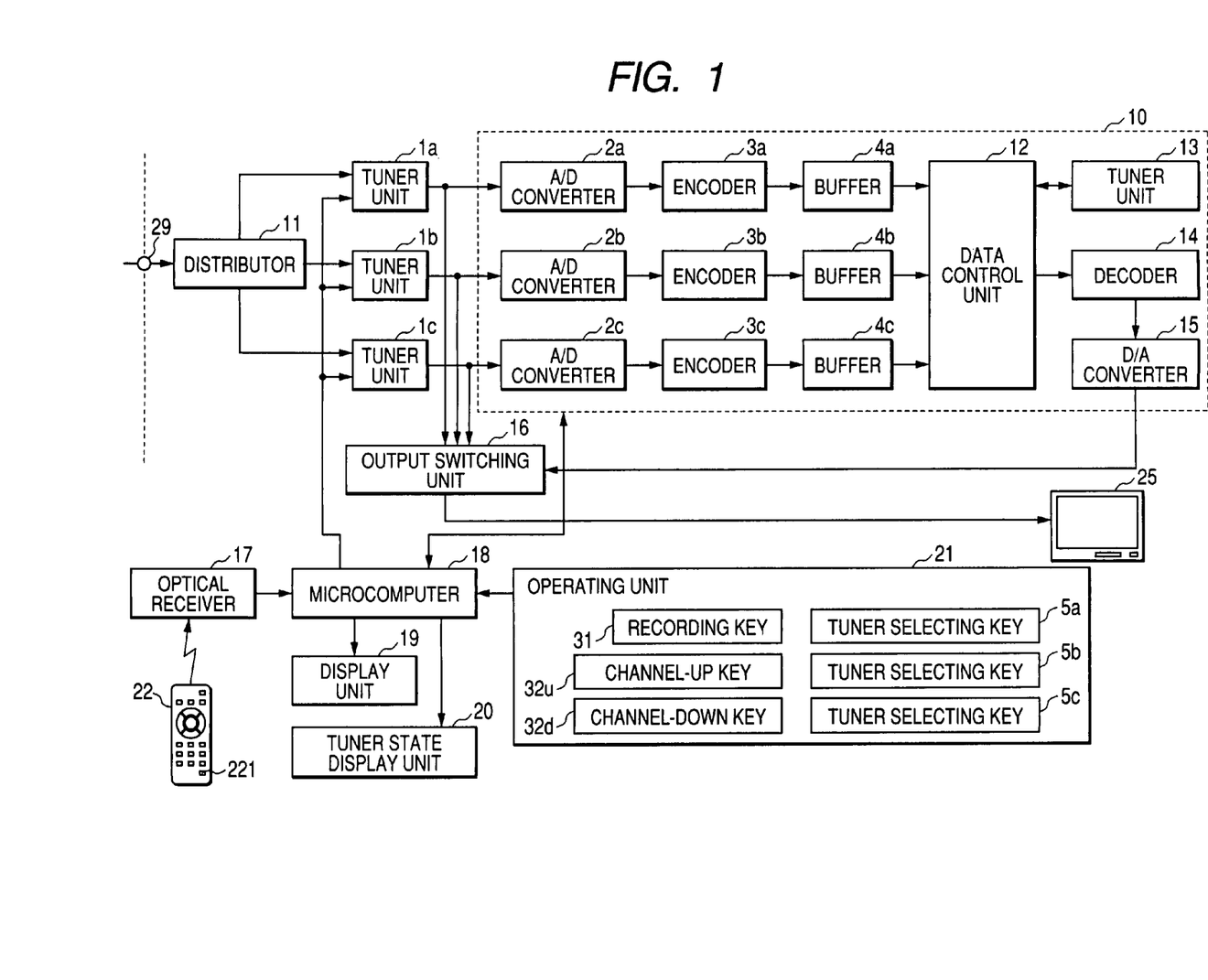
FIG. 1 is a block diagram illustrating the electrical structure of an HDD recorder, which is an embodiment of a video and audio recording apparatus according to the invention.
Figure 2:
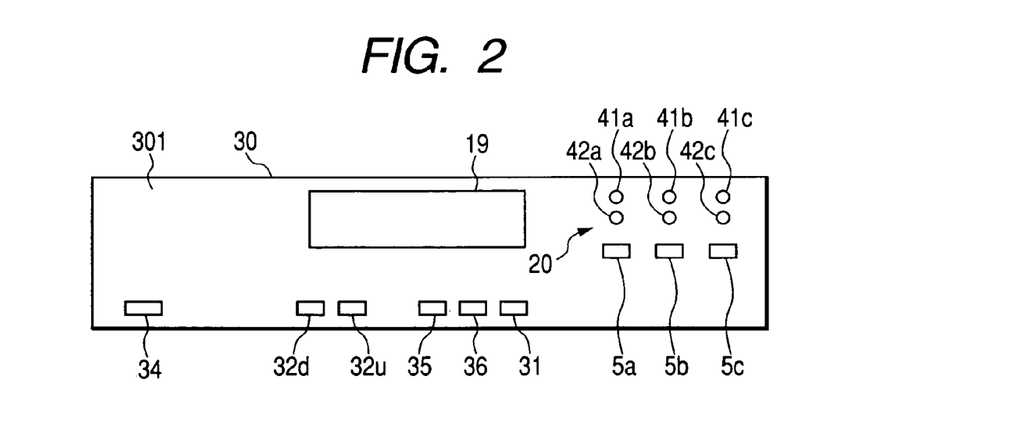
FIG. 2 is an explanatory diagram illustrating the state of a front panel of a main body of the apparatus.

FIG. 1 is a block diagram illustrating the electrical structure of a video and audio recording apparatus according to an embodiment of the invention. Specifically, FIG. 1 shows an HDD recorder capable of simultaneously recording three broadcasting programs using a hard disk driver as a recording medium. FIG. 2 is a view illustrating the shape of a front panel.

In the following description, when it is not necessary to discriminate blocks represented by codes having letters 'a' to 'c' added to ends thereof, the letters are omitted. However, when it is necessary to discriminate them, the letters 'a' to 'c' are added to the ends of the blocks, respectively.

In FIGS. 1 and 2, a distributor 11 distributes a high-frequency signal input to an input terminal 29 from the outside of an apparatus body 30 to three tuner units 1. Each of the tuner units 1 receives commercial broadcasting through the cannel indicated by a microcomputer 18, and outputs video and audio signals of the received broadcasting to A/D converters 2 respectively corresponding thereto.

A block 10 including three A/D converters 2, three encoders 3, three buffers 4, a data control unit 12, a hard disk drive (hereinafter, referred to as an HDD) 13, a decoder 14, and a D/A converter 15 serves as a video and image recording unit, and can simultaneously record the video and audio signals output from the three tuner units 1. In addition, hereinafter, for the sake of the simplicity of explanation, the 'video and audio signal outputs from the tuner units 1' is simply referred to as 'output signals from the tuner units 1'.

More specifically, the A/D converter 2 converts analog video and audio signals output from the tuner units 1 into digital video and audio signals. The encoder 3 compresses the video and audio signals output from the A/D converter 2 in a predetermined format (for example, MPEG2 format). The buffer 4 temporally stores the compressed video and audio signals.

When a predetermined amount of video and audio signal is stored in the butter 4, the data control unit 12 transmits the video and audio signal in the buffer 4 where the predetermined amount of video and audio signal is stored to the HDD 13 to be recorded thereon. In addition, the data control unit 12 reproduces the video and audio signals recorded on the HDD 13 to output them to the decoder 14. The decoder 14 performs an expansion process on the video and audio signals output from the data control unit 12 to output them to the D/A converter 15. The D/A converter 15 converts the digital video and audio signals output from the data control unit 12 into analog video and audio signals, and outputs them to an output switching unit 16.

The output switching unit 16 selects the video and audio signal indicated by the microcomputer 18 from four signals, that is, three signals output from the three tuner units 1 and one video and audio signal output from the D/A converter 15, and outputs it to a television set (display apparatus) 25 provided at the outside.

An operating unit 21 is a key switch group provided on a front panel 301 of the apparatus body 30, and information is input through the operating unit 21 by a user. More specifically, the operating unit 21 includes a power key 34, a channel-down key 32d, a channel-up key 32u, a reproduction key 35, a stop key 36, a recording key 31, and three tuner-selecting keys 5 (the other key switches are not shown in FIG. 2). The channel-down key 32d and the channel-up key 32u are operated to change receiving channels of the tuner unit 1. The recording key 31 is operated to record the output of the tuner unit 1 on the HDD 13.

The tuner-selecting key 5 is operated to select one tuner unit 1 to be set from the three tuner units 1. That is, for example, a tuner-selecting key 5a is operated to select a tuner unit 1a, and the channel-down key 32d or the channel-up key 32u is operated to change the channel received by the tuner 1a. In addition, when the recording key 31 is pushed after the tuner-selecting key 5a is operated, the output of the tuner unit 1a is recorded on the HDD 13. Further, when the stop key 36 is pushed after the tuner-selecting key 5a is operated, the recording of the output of the tuner unit 1a on the HDD 13 stops (when the output of the tuner unit 1a has not been stored on the HDD 13, this operation is neglected).

A display unit 19 is a display device provided in the front panel 301, and a program number being reproduced, time information on the reproduction position, etc., are displayed thereon. A tuner state display unit 20 displays whether the outputs of three tuner units 1 are respectively displayed on the television set 25, and whether the outputs are being recorded on the video and audio recording unit 10. In order for these operations, green LEDs 41 and orange LEDs 42 are provided.

An LED 41a is turned on when the output of the tuner unit 1a is displayed on the television set 25. An LED 41b is turned on when the output of the tuner unit 1b is displayed on the television set 25. An LED 41c is turned on when the output of the tuner unit 1c is displayed on the television set 25. In addition, an LED 42a is turned on when the output of the tuner unit 1a is being recorded on the video and audio recording unit 10. An LED 42b is turned on when the output of the tuner unit 1b is being recorded on the video and audio recording unit 10. An LED 42c is turned on when the output of the tuner unit 1c is being recorded on the video and audio recording unit 10. Therefore, two LEDs 41 are not turned on at the same time. However, only one LED 42 can be turned on, or two or three LEDs 42 can be turned on at the same time.

An optical receiver 17 receives infrared signals transmitted from a remote controller 22, and performs a predetermined process on the received signals to output signals representing the key switch operated through the remote controller 22 to the microcomputer 18. The remote controller 22 includes a power key, a recording key, a channel-up key, a channel-down key, number keys, and a tuner-switching key 221.

The tuner-switching key 221 is a key switch for selecting one tuner unit to be set from the three tuner units 1. Whenever the tuner-switching key 221 is pushed, tuner units 1 to be selected as a set target are changed from the tuner unit 1a to the tuner unit 1b, from the tuner unit 1b to the tuner unit 1c, or from the tuner unit 1c to the tuner unit 1a. That is, it is possible to designate one tuner unit 1 to be set from the three tuner units by using only one additional key switch.

The microcomputer 18 controls the main operations of the HDD recorder. That is, the microcomputer 18 controls the channels received by the tuners 1, corresponding to the operation of the user input to the operating unit 21 or the remote controller 22. In addition, the microcomputer 18 records the output of the tuner unit 1 designated by the user on the video and audio recording unit 10. Further, the microcomputer 18 receives programmed recording, and performs the programmed recording.

Figure 3:
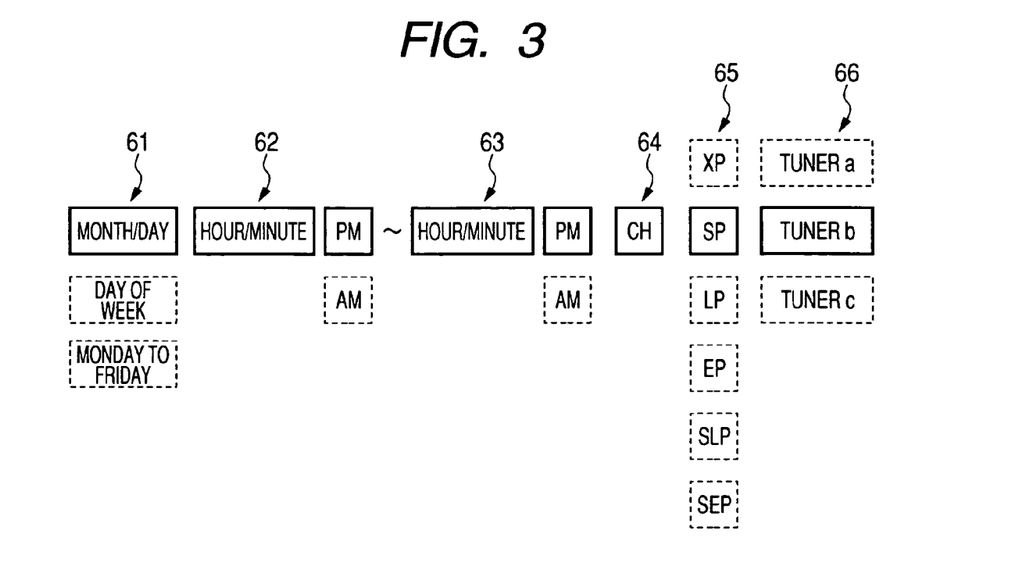
FIG. 3 is an explanatory diagram illustrating setting items of programmed recording.

Furthermore, when the programmed recording is set, the microcomputer 18 controls an on-screen display circuit (not shown) provided in the decoder 14 to display, on the television set 25, a screen for setting month and day 61 (alternatively, a day of the week or Monday to Friday), recording start time 62, recording end time 63, a receiving channel 64, a recording mode 65, and a tuner unit 66 to be used, as shown in FIG. 3.

Figure 7A:
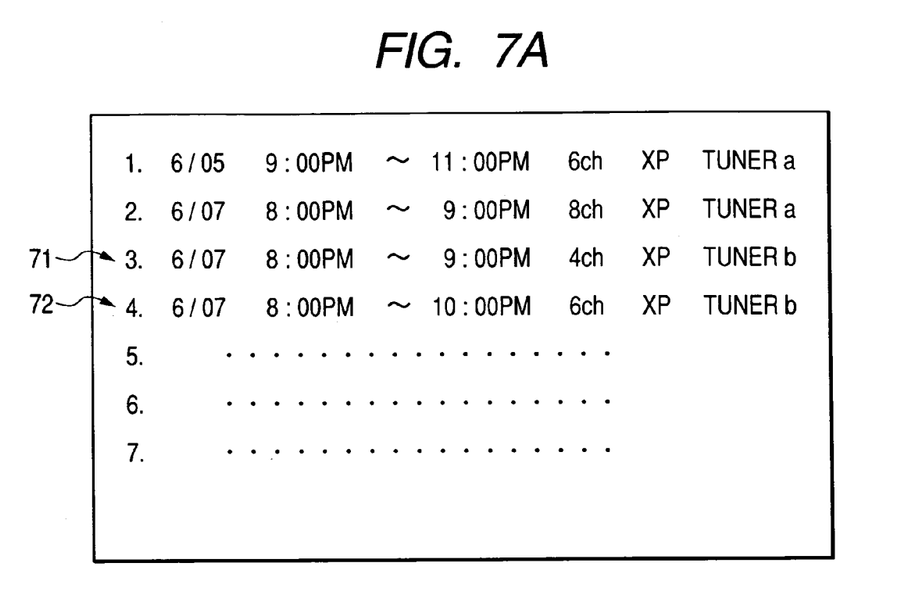
FIGS. 7A and 7B are explanatory diagrams illustrating display contents when programmed recording item are set.
Figure 7B:
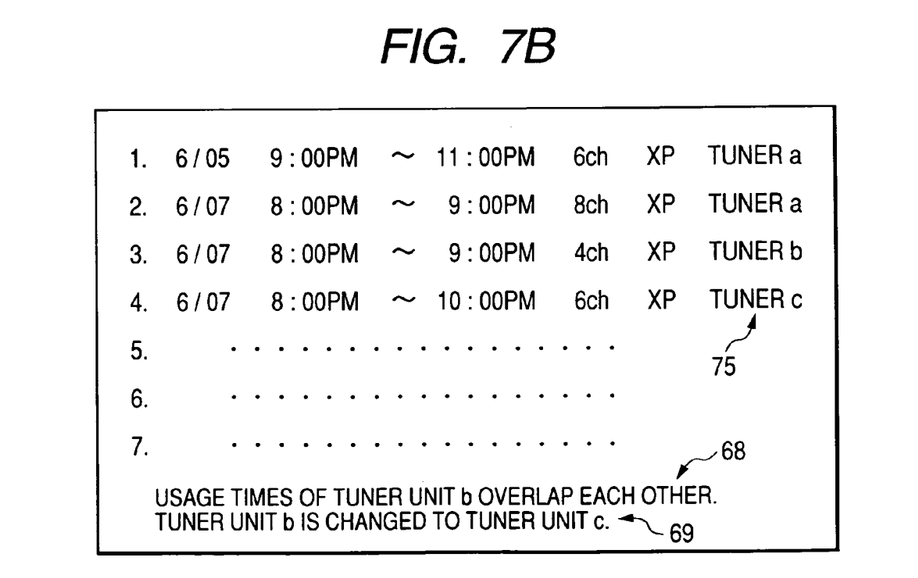

As shown in FIG. 7A, when the tuner unit used for a programmed recording item 72 whose recording time overlaps at least a portion of the recording time of a programmed recording item 71 previously set is the same as the tuner unit 1b used for the programmed recording item 71 previously set, a message indicating that the usage times of the tuner unit overlap each other is displayed, as represented by reference numeral 68 in FIG. 7B. In addition, the tuner unit 1c having different usage time from that of the tuner unit 1b is automatically selected, and is displayed in a tuner selection field (which is represented by reference numeral 75)

Figure 4:
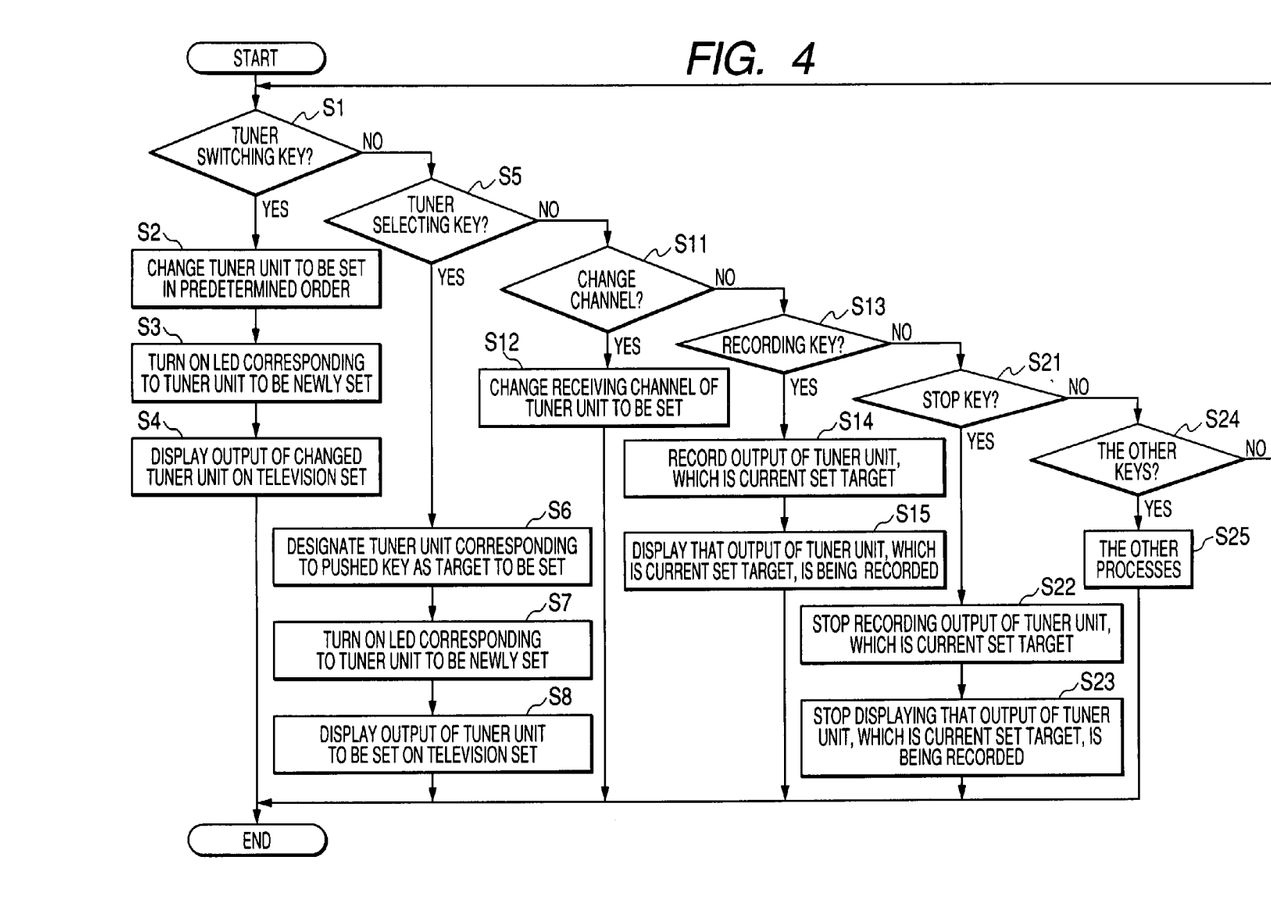
FIG. 4 is a flow chart illustrating the main operations when receiving channels of tuner units are set.

FIG. 4 is a flow chart illustrating the main operations of this embodiment when the tuner unit is set. The operations of this embodiment will be described with reference to the drawings.

First, it is considered that the output of the tuner unit 1a is displayed on the television set 25, and that all outputs of three tuner units 1 are not recorded. In this case, the LED 41a among three LEDs 41 is turned on to indicate that the output of the tuner 1a is displayed on the television set 25. In addition, three LEDs 42 are all in an off state. This state is referred to as an initial state.

In the initial state, when the tuner-switching key 221 is operated, the microcomputer 18 switches the tuners 1 to be set in a predetermined order. Therefore, the tuner units 1 to be set are switched from the tuner unit 1a to the tuner unit 1b (steps S1 and S2). Then, the LED 41a is turned off, and the LED 41b is turned on, in order to indicate that the tuner units 1 to be set are switched from the tuner unit 1a to the tuner unit 1b (step S3). Subsequently, the video and audio signals output from the tuner unit 1b are displayed on the television set 25 (step S4).

Further, in the initial state, when the tuner-selecting key 5c is operated, the microcomputer 18 changes the tuner units 1 to be set from the tuner unit 1a to the tuner unit 1c (steps S5 and S6). Then, the LED 41a is turned off, and the LED 41c is turned on, in order to indicate that the tuner units 1 to be set are switched from the tuner unit 1a to the tuner unit 1c (step S7). Subsequently, the video and audio signals output from the tuner unit 1c are displayed on the television set 25 (step S8).

Furthermore, in the initial state, when the channel-up key 32u, the channel-down key 32d, or the number key of the remote controller 22 is operated, the channel received by the tuner unit 1a is changed (the channel received by the tuner unit 1b or the tuner unit 1c is not changed) (steps S11 and S12).

Moreover, in the initial state, when the recording key 31 is operated, the recording of the output of the tuner unit 1a starts in the video and audio recording unit 10 (the output of the tuner unit 1b or the tuner unit 1c is not recorded) (steps S13 and S14). In addition, the LED 42a corresponding to the tuner unit 1a is turned on to indicate that the output of the tuner unit 1a is being recorded (step S15).

In the above-mentioned state, when the tuner-switching key 221 or the tuner-selecting key 5b is operated, the tuner units 1 to be set are changed from the tuner unit 1a to the tuner unit 1b. In this state, when the recording key 31 is operated, the recording of the output of the tuner unit 1b starts (steps S13 and S14). In addition, the LED 42b is turned on (step S15). As a result, two LEDs 42a and 42b are turned on to indicate that the output of the tuner unit 1a and the output of the tuner unit 1b are being recorded in the video and audio recording unit 10.

Further, when the tuner-switching key 221 or the tuner-selecting key 5c is operated, the tuner units 1 to be set are changed from the tuner unit 1b to the tuner unit 1c. Then, when the recording key 31 is operated, the recording of the output of the tuner unit 1c starts (steps S13 and S14). In addition, the LED 42c is turned on (step S15). As a result, three LEDs 42a, 42b, and 42c are turned on to indicate that the outputs of the tuner units 1a to 1c are being recorded in the video and audio recording unit 10 at the same time.

In the above-mentioned state, when the stop key 36 is operated, the recording of the output of the tuner unit 1c stops (steps S21 and S22). In addition, the LED 42c is turned off (the recording of the outputs of the tuner units 1a and 1b is continued) (step S23).

Further, when key switches other than the above-mentioned key switches (the tuner-switching key 221, the tuner-selecting keys 5, the keys for changing channels, the recording key 31, and the stop key 36) are pushed, operations corresponding to the pushed key switches are performed (steps S24 and S25).

As described above, by further providing the tuner-selecting switches 5 in the front panel 301 having the channel-up key 32u, the channel-down key 32d, the recording key 31, and the stop key 36 therein, these keys can be operated to display the outputs of three tuners 1 on the television set 25 or to record them to the video and audio recording unit 10, according to user's preference, even when the remote controller 22 is lost.

Furthermore, even when the key switches provided in the remote controller 22 which designate the same operations as the key switches (except the tuner-switching key 221) provided in the front panel 301 are operated, the same operations are performed.

Figure 5:
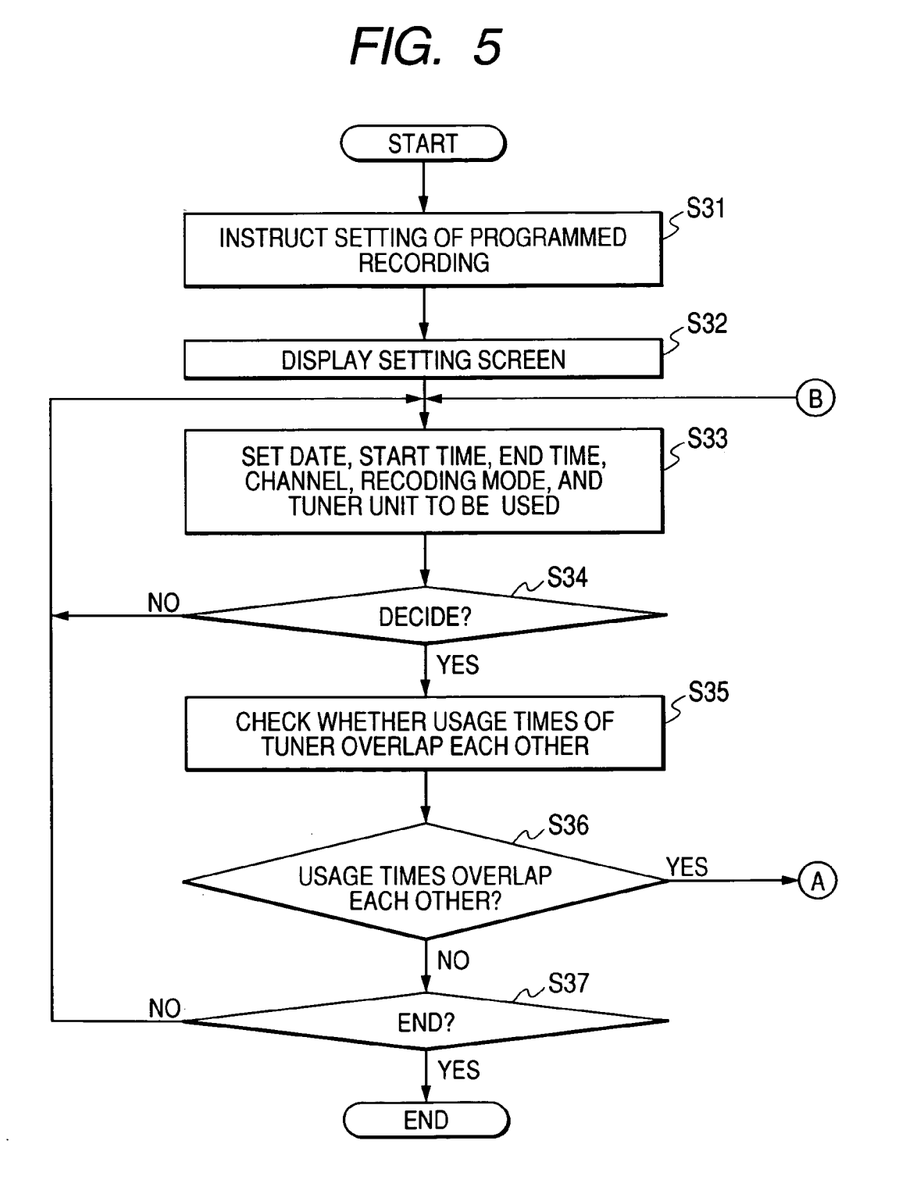
FIG. 5 is a flow chart illustrating the main operations when programmed recording item are set.
Figure 6:
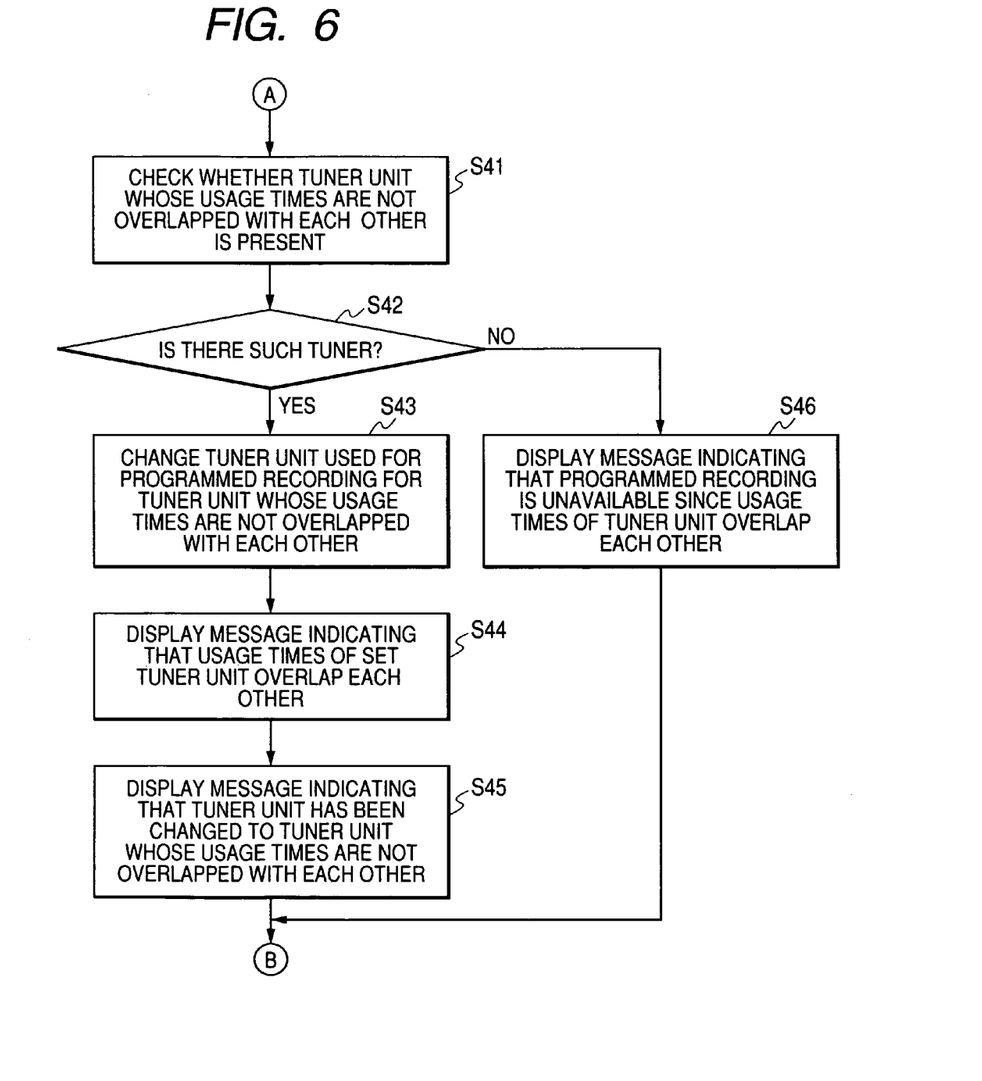
FIG. 6 is a flow chart illustrating the main operations when programmed recording item are set.

FIGS. 5 and 6 show flow charts illustrating the main operations of this embodiment when programmed recording is set. The operations of this embodiment will be described with reference to the drawings.

When a set key provided in the remote controller 22 is operated to set programmed recording, a screen requiring for setting six setting items 61 to 66 is displayed, as shown in FIG. 3 (steps S31 and S32). Then, when a decision key (not shown) is operated after the six items 61 to 66 are set, the setting of one programmed recording item is completed (steps S33 and S34).

In a case in which the decision key is operated to complete the setting of one programmed recording item, when the tuner unit 1 used for the set programmed recording item is the same as the tuner unit 1 used for the other programmed recording items, the microcomputer 18 checks whether the usage times of the tuner unit overlap each other (step S35). When the usage times of the tuner unit 1 do not overlap each other, it is determined whether to end the setting of the programmed recording. When the setting is not ended, the process proceeds from steps S36 and S37 to step S33 to set the next programmed recording item After this process is repeatedly performed to complete the setting of three programmed recording items from a programmed recording number '1' to a programmed recording number '3' shown in FIG. 7A, a programmed recording number '4' is set (which is represented by reference numeral 72), and then the decision key for indicating that the setting of the programmed recording number '4' is completed is operated. In the case in which the decision key is operated, when the tuner unit 1b used for the programmed recording of the programmed recording number '4' is also used for other programmed recording numbers, it is checked whether the usage times of the tuner unit 1b overlap each other. In this case, the tuner unit 1b is used for the programmed recording of the programmed recording number '3', and thus the usage times of the tuner unit 1b overlap each other.

Therefore, in this case, the process proceeds from step S36 to step S41. Then, it is checked whether an unused tuner unit 1 exists from 8 p.m. to 10 p.m., June seventh, which is the usage time of the programmed recording number '4'. In this case, the tuner unit 1c is found as an unused tuner unit 1. Therefore, the microcomputer 18 automatically changes the tuner unit used for setting the programmed recording number '4' from the tuner unit 1b to the tuner unit 1c (steps S42 and S43).

Accordingly, 'TUNER c' indicating the tuner unit 1c is displayed as the tuner unit used for the programmed recording of the programmed recording number '4' (which is represented by reference numeral 75). Further, in this case, a message indicating that the tuner unit 1b set by the user cannot be used since its usage time overlaps the usage time of the programmed recording item previously set (which is represented by reference numeral 68) is displayed (step S44). In addition, a message indicating that the tuner unit 1 used is changed from the tuner unit 1b to the tuner unit 1c (which is represented by reference numeral 69) is displayed (step S45). Then, the process proceeds to step S33.

Further, it is checked in step S41 whether the usage times of the tuner unit 1 overlap each other. When the tuner unit 1 whose usage times are not overlapped with each other is not found, the process proceeds from step S42 to step S46. Since the tuner unit 1 whose usage times are not overlapped with each other does not exist, a message indicating that the programmed recording cannot be set is displayed. Then, the process proceeds to step S33.

Furthermore, the invention is not limited to the above-described embodiment in which, in the tuner sate display unit 20, each tuner unit 1 is provided with two LEDs 41 and 42. However, for example, a device can be used in which a green light emitting diode and a red light emitting diode are provided in a main body thereof, that is, two light-emitting diodes having different emission colors are provided in the main body thereof.

In this structure, only the green light emitting diode is turned on (emits a green light component) to indicate that the video and audio signals are displayed on the television set 25. In addition, only the red light emitting diode is turned on (emits a red light component) to indicate that the video and audio signals are being recorded in the video and audio recording unit 10. Further, both the green light emitting diode and the red light emitting diode are turned on (emit an orange light component) to indicate that the video and audio signals are displayed on the television set 25 and are being recorded in the video and audio recording unit 10 (other arbitrary combinations can be made by a combination of the emission color of the device and the three states of the tuner units 1).

Further, in the video and audio recording unit 10, the HDD 13 is used as a recording medium. However, when data writing can be performed at high speed, an optical disk can be used as a recording medium, or arbitrary recording media other than the optical disk can be used.

What is claimed is:

1. A video and audio recording apparatus comprising:
a plurality of tuner units each of which is configured to receive commercial broadcasting and to output video and audio signals;
a video and audio recording unit operable to simultaneously record the video and audio signals output from each of the tuner units; and
a controller operable to cause the video and audio recording unit to perform a first programmed recording while selecting a first one of the tuner units,
wherein in a case of overlapped recording where a recording time period of the first programmed recording overlaps with a recording time period of a second programmed recording which is set in advance to use the first one of the tuner units, the controller is configured to detect a second one of the tuner units having no programmed recording of which a recording time period overlaps with the recording time period of the second programmed recording, wherein, in a case where the second one of the tuner units is detected by the controller, the controller is configured to automatically set the first programmed recording to use the second one of the tuner units, and wherein, in a case where no tuner unit is detected by the controller, the controller is configured to stop performing the first programmed recording and to cause an indicator to display a message indicating that the first programmed recording cannot be executed.

2. The video and audio recording apparatus according to claim 1, wherein the controller is configured to cause an indicator to display a message indicating that the first programmed recording cannot be executed in the first one of the tuner units, in the case of the overlapped recording where the recording time period of the first programmed recording overlaps with the recording time period of the second programmed recording which is set in advance to use the first one of the tuner units.

3. The video and audio recording apparatus according to claim 1 further comprising:
   a front panel;
   a remote controller;
   a single tuner switching key provided on the remote controller and operable to select, in a predetermined order, one of the tuner units as a tuner unit in which at least one of a channel of the commercial broadcasting to be received and whether the video and audio signals to be output is recorded by the video and audio recording unit is set; and
   a plurality of tuner selecting keys provided on the front panel, the number of which is equal to the number of the tuner units so that the tuner selecting keys are corresponded to the tuner units in one-by-one manner,
   wherein each of the tuner selecting keys is operable to select an associated one of the tuner units as a tuner unit in which at least one of a channel of the commercial broadcasting to be received and whether the video and audio signals to be output is recorded by the video and audio recording unit is set.

4. The video and audio recording apparatus according to claim 1 further comprising:
   a tuner state display unit operable to indicate whether the video and audio signals output from each of the tuner units are displayed on a display device and whether the video and audio signals output from each of the tuner units are recorded by the video and audio recording unit.

* * * * *